March 7, 1967  M. DEVELEY  3,307,604
ANTISKID CHAIN
Filed June 1, 1965

3,307,604
ANTISKID CHAIN
Marcel Develey, Crissier, Switzerland
Filed June 1, 1965, Ser. No. 460,122
Claims priority, application Switzerland, Mar. 26, 1965,
4,256/65
2 Claims. (Cl. 152—229)

Antiskid chains are not generally advisable for running over a ground which is not covered with snow, whether such a ground is dry, wet or iced, because such chains have a poor adherence over such ground surfaces and the proper behavior of vehicles on such grounds is jeopardized thereby to a substantial extent.

Such a drawback forms one of the main reasons for the considerable favor enjoyed nowadays by pneumatic tires provided with studs. Such tires are however not sufficient when the vehicle provided therewith is to run over fresh snow or over comparatively large slopes.

My invention has for its object to cut out such drawbacks and it covers an element of an antiskid chain incorporating antiskid studs.

Elements of this type may be associated to form links secured to the rim of the vehicle wheel independently of one another or else to an antiskid chain adapted to be fitted round the periphery of the penumatic tire.

The accompanying drawing illustrates by way of example a preferred embodiment of my invention. In said drawing.

Figure 1:
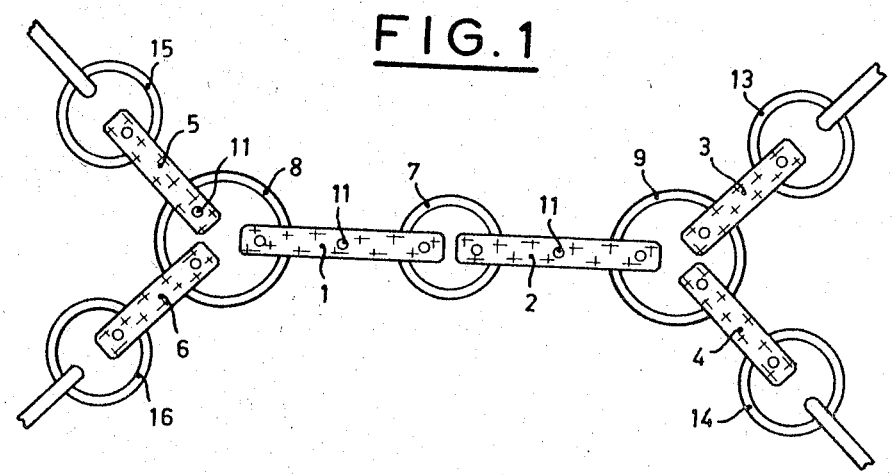
FIG. 1 is a plan view of a chain link according to my invention.
Figure 2:
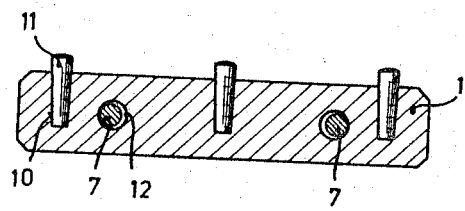
FIG. 2 is a longitudinal cross-section of one of its elements.

The chain link illustrated is constituted by six small steel plates or elements 1, 2, 3, 4, 5, 6 which are interconnected by the three rings 7, 8 and 9.

The central plates 1 and 2, have a rectangular cross-section and are provided each in its upper surface with three conical depressions 10 inside each of which is fitted a stud 11 of a very hard metal, such as tungsten steel. The projecting section of each stud 11 has a length substantially equal to one third of the total height of said stud.

Each of the small plates 1 and 2 is provided furthermore with two holes 12 extending perpendicularly to the plane defined by the axes of the studs 11, and through said holes are inserted rings, to wit the rings 7 and 8 in the case of the plate 1, and the rings 7 and 9 in the case of the plate 2. Said rings are obviously opened for their assembly with the cooperating bars and closed only after the assembly.

The other small plates 3, 4, 5, 6 are similar to the small plates 1 and 2, but carry only two studs 11 instead of three. They have, as in the case of the small plates 1 and 2, holes or passageways one of which is adapted to be engaged by the ring 9 in the case of the plates 3 and 4 or by the ring 8 in the case of the plates 5 and 6, while the other hole or passageway provides means for engaging a further ring 13, 14, 15 or 16 as the case may be, wnich serves for securing the plate considered to the wheel of the vehicle. Thus the ring 7 connects the central plates or elements 1 and 2, the rings 8 and 9 connect respectively the plates 1 and 2 with the corresponding outer plates 5–6 and 3–4, which are in their turn secured by the rings 15, 16, 13 and 14 with the vehicle wheel.

The studs carried by the chain elements illustrated provide the links with antiskid properties similar to those obtained by securing similar studs to a conventional antiskid tire. Under such conditions, it is an easy matter to run with a chain of my improved type even on a slightly wet road or an icy road without any risk of an untimely skidding.

What I claim is:

1. An antiskid chain link comprising a plurality of metallic plates linked to one another by a linking ring, each plate carrying at least two ground-engaging studs, projecting beyond said plate each of said plates having an opening between said studs along an axis substantially perpendicular to the longitudinal axis of the corresponding plate, said linking ring passing through said opening, the projecting section of each stud being substantially equal to one third of the total height thereof, and means for securing the outermost of said rings to a vehicle wheel.

2. An antiskid chain link according to claim 1, comprising a pair of rectangular central plates having three conical depressions in the upper surface thereof, a hard surface stud fitting in each of said depressions and protruding therefrom, each of said plates having two holes extending perpendicularly to the plane defined by the axes of said nails, said central plates being linked by a linking ring passing through one hole of one of said plates; two pairs of smaller plates each having two recesses in the upper surface thereof with a hard metal stud fitting therein and projecting therefrom, each of said plates having two holes extending perpendicularly to the plane defined by the studs therein, each member of each pair being connected to the other hole of each of said central plates by means of a ring passing through said hole and one of the holes of each member of each pair, and means fitting in each of said other hole for securing said link to the wheel of the vehicle.

References Cited by the Examiner

UNITED STATES PATENTS

| 1,961,549 | 6/1934 | Calhoun | 152—229 |
| 2,911,027 | 11/1959 | Branson | 152—239 |
| 3,125,147 | 3/1964 | Hakka | 152—210 |

ARTHUR L. LA POINT, *Primary Examiner.*
C. HAEFELE, *Assistant Examiner.*